United States Patent
Mizumoto

(10) Patent No.: US 12,260,876 B2
(45) Date of Patent: Mar. 25, 2025

(54) VOICE CONFERENCE APPARATUS, VOICE CONFERENCE SYSTEM AND VOICE CONFERENCE METHOD

(71) Applicant: Hylable Inc., Tokyo (JP)

(72) Inventor: Takeshi Mizumoto, Tokyo (JP)

(73) Assignee: Hylable Inc., Tokyo (JP)

( * ) Notice: Subject to any disclaimer, the term of this patent is extended or adjusted under 35 U.S.C. 154(b) by 244 days.

(21) Appl. No.: 18/071,636

(22) Filed: Nov. 30, 2022

(65) Prior Publication Data

US 2023/0093298 A1 Mar. 23, 2023

Related U.S. Application Data

(63) Continuation of application No. PCT/JP2020/021646, filed on Jun. 1, 2020.

(51) Int. Cl.
*H04L 65/403* (2022.01)
*G06F 3/14* (2006.01)
*G10L 25/51* (2013.01)

(52) U.S. Cl.
CPC ............... *G10L 25/51* (2013.01); *G06F 3/14* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 7,319,745 B1* | 1/2008 | Firestone | H04M 3/42025 709/204 |
| 9,324,323 B1* | 4/2016 | Bikel | G10L 15/197 |
| 11,120,342 B2* | 9/2021 | Kitada | G06F 16/9535 |
| 11,882,161 B2* | 1/2024 | Gupta | H04L 65/1093 |
| 2007/0106724 A1* | 5/2007 | Gorti | H04M 3/56 709/204 |
| 2013/0195259 A1 | 8/2013 | Barsoba et al. | |
| 2014/0372941 A1* | 12/2014 | Parsons | H04L 12/1827 715/810 |
| 2017/0132518 A1* | 5/2017 | Kitada | H04N 7/147 |
| 2018/0352079 A1* | 12/2018 | Hodge | H04L 9/3226 |
| 2020/0335105 A1* | 10/2020 | Tsunashima | G10L 15/26 |

FOREIGN PATENT DOCUMENTS

| | | |
|---|---|---|
| JP | 2003299051 | 10/2003 |
| JP | 2015510716 | 4/2015 |
| JP | 2018124456 | 8/2018 |

(Continued)

*Primary Examiner* — Nafiz E Hoque
(74) *Attorney, Agent, or Firm* — JCIPRNET

(57) ABSTRACT

A voice conference apparatus that provides a plurality of voice conferences via a network, the voice conference apparatus including: a voice conference section that transmits and receives a sound generated in each of the plurality of voice conferences to and from a plurality of user terminals used by a plurality of users participating in the voice conference; a sound analyzing section that analyzes the sound generated in each of the plurality of voice conferences; and a display control section that causes an administrator terminal used by an administrator administering the plurality of voice conferences to display a result of the analysis, by the sound analyzing section, of the sound generated in each of the plurality of voice conferences, in association with the voice conference.

17 Claims, 9 Drawing Sheets

(56) References Cited

FOREIGN PATENT DOCUMENTS

| | | |
|---|---|---|
| JP | 2018170009 | 11/2018 |
| WO | 2008078555 | 7/2008 |
| WO | 2019139101 | 7/2019 |
| WO | 2019142230 | 7/2019 |
| WO | 2019142231 | 7/2019 |

\* cited by examiner

VOICE CONFERENCE APPARATUS, VOICE CONFERENCE SYSTEM AND VOICE CONFERENCE METHOD

CROSS-REFERENCE TO RELATED APPLICATIONS

The present application is a continuation application of International Application number PCT/JP2020/21646, filed on Jun. 1, 2020. The contents of this application are incorporated herein by reference in their entirety.

BACKGROUND OF THE INVENTION

The present disclosure relates to a voice conference apparatus, a voice conference system and a voice conference method for executing voice conferences via a network.

In recent years, the use of systems for holding voice conferences via networks between a plurality of information terminals has been becoming increasingly widespread. Japanese Unexamined Patent Application Publication No. 2003-299051 discloses a system that identifies a speaker who is uttering in a voice conference, and visually clearly indicates the identified speaker.

BRIEF SUMMARY OF THE INVENTION

An administrator such as a teacher or a boss administers a plurality of voice conferences at a school or a company, in some cases. However, according to the system disclosed in Japanese Unexamined Patent Application Publication No. 2003-299051, simply a speaker in participants in one voice conference is clearly indicated, so the administrator cannot know the situations of a plurality of voice conferences easily.

The present disclosure has been made in view of these points, and an object thereof is to make it possible for an administrator to know the situations of a plurality of voice conferences easily.

A voice conference apparatus according to a first aspect of the present disclosure is a voice conference apparatus that provides a plurality of voice conferences via a network, the voice conference apparatus including: a voice conference section that transmits and receives a sound generated in each of the plurality of voice conferences to and from a plurality of user terminals used by a plurality of users participating in the voice conference; a sound analyzing section that analyzes the sound generated in each of the plurality of voice conferences; and a display control section that causes an administrator terminal used by an administrator administering the plurality of voice conferences to display a result of the analysis, by the sound analyzing section, of the sound generated in each of the plurality of voice conferences, in association with the voice conference.

A voice conference system according to a second aspect of the present disclosure is a voice conference system including: a voice conference apparatus that provides a plurality of voice conferences via a network; and an administrator terminal used by an administrator administering the plurality of voice conferences, in which the voice conference apparatus has: a voice conference section that transmits and receives a sound generated in each of the plurality of voice conferences to and from a plurality of user terminals used by a plurality of users participating in the voice conference; a sound analyzing section that analyzes the sound generated in each of the plurality of voice conferences; and a display control section that causes the administrator terminal to display a result of the analysis, by the sound analyzing section, of the sound generated in each of the plurality of voice conferences, in association with the voice conference, and the administrator terminal has a display section that displays the result of the analysis.

A voice conference method according to a third aspect of the present disclosure is a voice conference method executed by a computer, the voice conference method including: transmitting and receiving a sound generated in each of a plurality of voice conferences via a network to and from a plurality of user terminals used by a plurality of users participating in the voice conference; analyzing the sound generated in each of the plurality of voice conferences; and causing an administrator terminal used by an administrator administering the plurality of voice conferences to display a result of the analysis, at the step of analyzing, of the sound generated in each of the plurality of voice conferences, in association with the voice conference.

DETAILED DESCRIPTION OF THE INVENTION

Although the present invention is explained by using an embodiment of the invention below, the following embodiment does not limit the invention according to claims, and all combinations of features explained in the embodiment are not necessarily essential for solutions according to the invention.

[Overview of Voice Conference System S]

Figure 1:
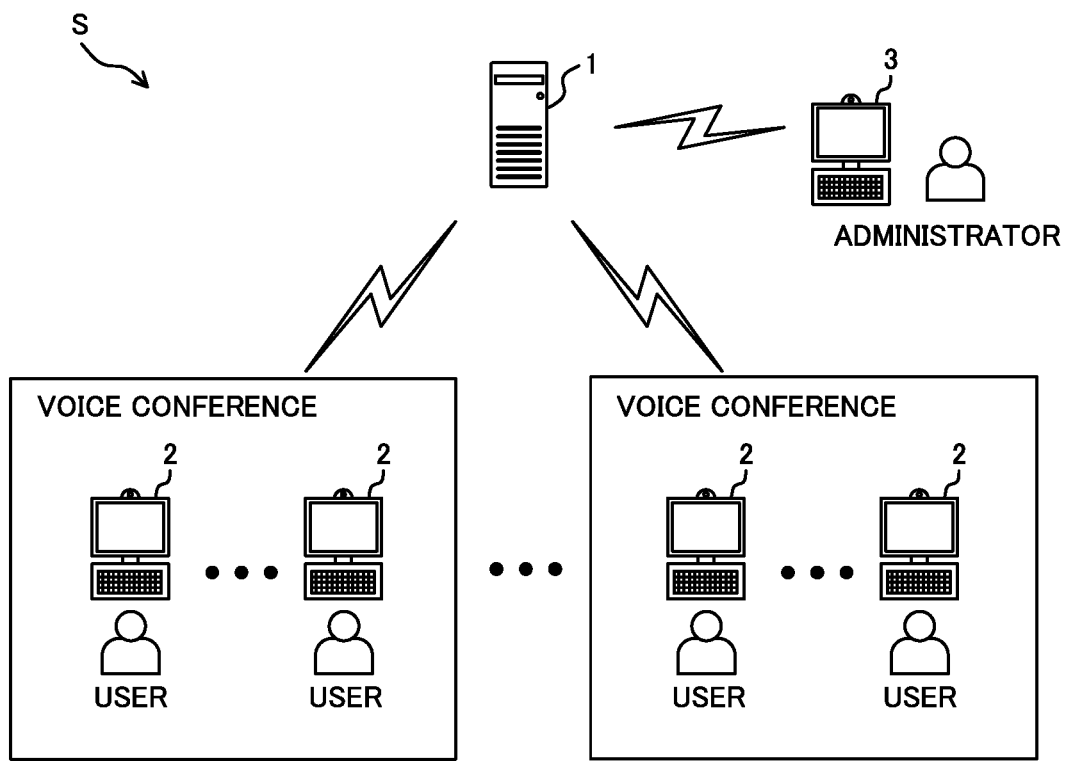
FIG. 1 is a schematic diagram of a voice conference system according to an embodiment.

FIG. 1 is a schematic diagram of a voice conference system S according to the present embodiment. The voice conference system S includes a voice conference apparatus 1, a plurality of user terminals 2 and an administrator terminal 3. The numbers of user terminals 2 and administrator terminals 3 included in the voice conference system S are not limited. The voice conference system S may include other equipment such as servers or terminals.

The voice conference apparatus 1 is a computer that provides a plurality of voice conferences via a network. In a voice conference, sounds are exchanged between a plurality of user terminals 2. In a voice conference, in addition to sounds, images (the images may be still images or moving images) and/or texts may be exchanged between a plurality of user terminals 2. In addition, the voice conference apparatus 1 analyzes sounds generated in voice conferences, and displays analysis results on the user terminals 2 and the administrator terminal 3.

For example, the voice conference apparatus 1 includes a single computer or a cloud which is a set of computer resources. The voice conference apparatus 1 is connected by a cable or wirelessly to the user terminals 2 or the administrator terminal 3 via a network such as a local area network or the Internet.

The user terminals 2 are information terminals used by users (students, employees, etc.) participating in voice conferences provided by the voice conference system S. For example, the user terminals 2 are personal computers, smartphones, tablet terminals and the like. In addition, the user terminals 2 may be wearable terminals that are worn by the users, and receive input of sounds and images, and output sounds and images. The user terminals 2 accept input of sounds of the users, and transmit them to the voice conference apparatus 1, and also receive sounds input at other user terminals 2 from the voice conference apparatus 1, and output them. Whereas one user uses one user terminal 2 in an example explained in the present embodiment, a plurality of users may use one user terminal 2.

The administrator terminal 3 is an information terminal used by an administrator (a teacher, a boss or the like who is at the position of administering users) who administers one or more voice conferences provided by the voice conference system S. For example, the administrator terminal 3 is a personal computer, a smartphone, a tablet terminal or the like. In addition, the administrator terminal 3 may be a wearable terminal that is worn by the administrator, and receives input of sounds and images, and outputs sounds and images. The administrator terminal 3 displays results of sound analysis by the voice conference apparatus 1, and also accepts interventions in voice conferences by the administrator.

In the voice conference system S according to the present embodiment, the voice conference apparatus 1 analyzes sounds generated in each of a plurality of voice conferences, and causes the administrator terminal 3 to display results of the sound analysis in association with the corresponding one of the plurality of voice conferences. Thereby, the voice conference system S can give the administrator an overall perspective of the situations of the plurality of voice conferences, and allow the administrator to easily know the situations of the plurality of voice conferences.

[Configuration of Voice Conference System S]

Figure 2:
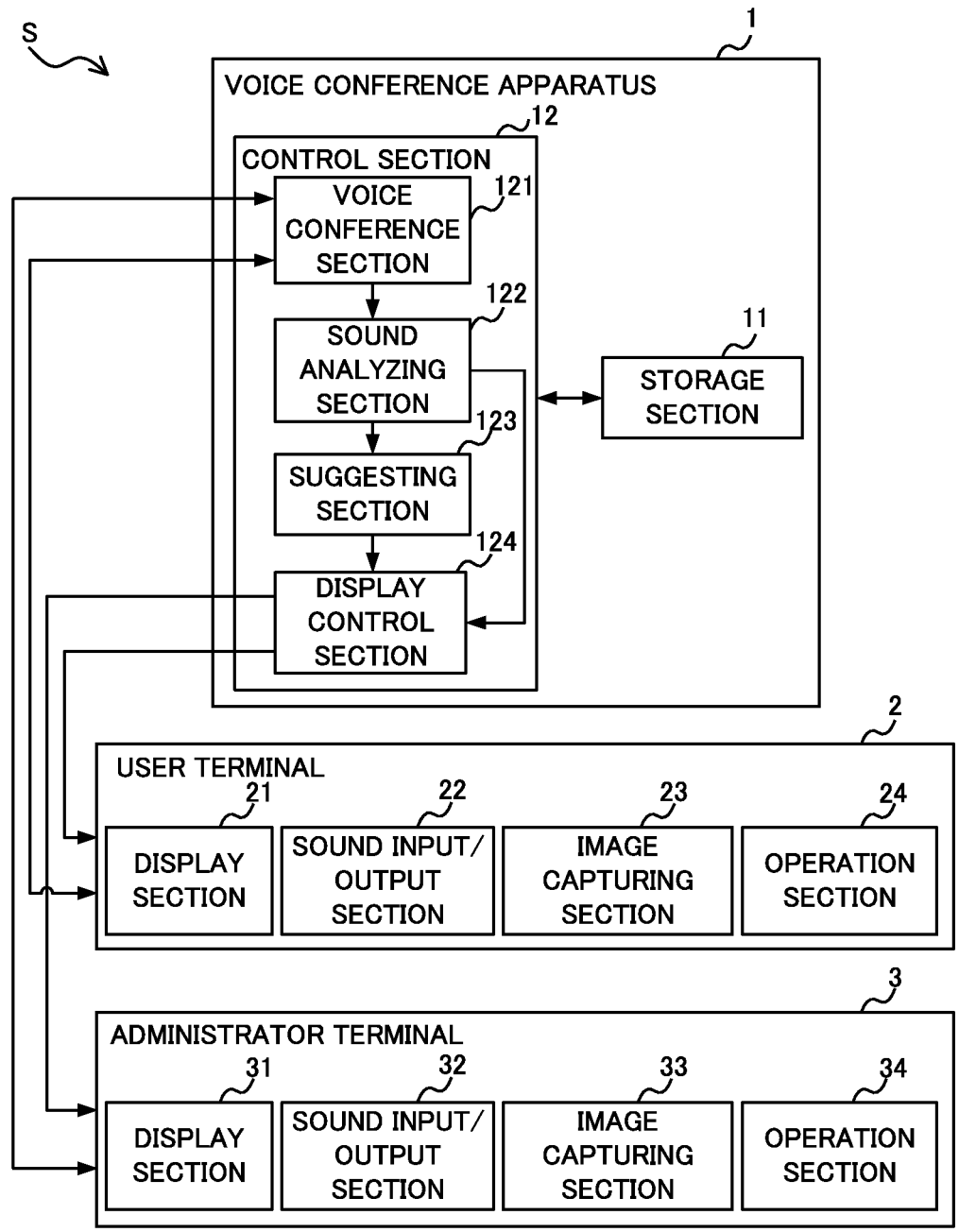
FIG. 2 is a block diagram of the voice conference system according to the embodiment.

FIG. 2 is a block diagram of the voice conference system S according to the present embodiment. In FIG. 2, arrows represent major data flows, and there may be data flows not depicted in FIG. 2. In FIG. 2, blocks represent not configuration in hardware (apparatus) units, but configuration in functional units. Accordingly, blocks depicted in FIG. 2 may be implemented in a single apparatus, or may be implemented separately in a plurality of apparatuses. Data exchange between blocks may be performed via any means such as a data bus, a network or a portable storage medium.

The voice conference apparatus 1 has a storage section 11 and a control section 12. The control section 12 has a voice conference section 121, a sound analyzing section 122, a suggesting section 123 and a display control section 124. The storage section 11 is a storage medium including a ROM (Read Only Memory), a RAM (Random Access Memory), a hard disk drive and the like. On the storage section 11, a program to be executed by the control section 12 is stored in advance. The storage section 11 may be provided outside the voice conference apparatus 1, and, in that case, may perform data exchange with the control section 12 via a network.

For example, the control section 12 is a processor such as a CPU (Central Processing Unit), and executes the program stored on the storage section 11 to thereby function as the voice conference section 121, the sound analyzing section 122, the suggesting section 123 and the display control section 124. At least some of the functionalities of the control section 12 may be executed by an electrical circuit. In addition, at least some of the functionalities of the control section 12 may be executed by a program executed through a network.

The voice conference section 121 executes a plurality of voice conferences by transmitting and receiving sounds to and from the plurality of user terminals 2. The voice conference section 121 transmits and receives sounds generated in voice conferences (i.e. sounds input to sound input/output sections 22) to and from a plurality of user terminals 2 used by a plurality of users participating in the voice conferences. In addition, the voice conference section 121 transmits and receives captured images of users participating in voice conferences (i.e. captured images captured by image capturing sections 23) to and from a plurality of user terminals 2 used by a plurality of users participating in the voice conferences. In addition, the voice conference section 121 transmits and receives content input by a plurality of users participating in voice conferences (input texts, actions, etc.) to and from a plurality of user terminals 2 used by the users participating in the voice conferences.

Thereby, the voice conference section 121 can cause sounds, captured images and input content to be shared among a plurality of user terminals 2, and execute voice conferences. In order to execute the voice conferences, the voice conference section 121 can use not only a specific method depicted here, but known methods.

In addition, the voice conference section 121 may accept an intervention of the administrator terminal 3 by using a text or a sound in a voice conference for which the suggesting section 123 suggests the intervention, or intervene in the voice conference by using a text or a sound automatically. For example, the intervention in the voice conference is made by outputting, to a user terminal 2 of each user participating in the voice conference, at least one of a text, a sound and an image input to the administrator terminal 3 by the administrator or by outputting, to a user terminal 2 of each user participating in the voice conference, at least one of a text, a sound and an image generated by the voice conference section 121.

For example, in a case that an operation of selecting an intervention button 314 corresponding to any of voice conferences is performed on an operation section 34 of the administrator terminal 3, the voice conference section 121 starts transmission and reception of a sound and/or a text between the administrator terminal 3 and a plurality of user terminals 2 participating in the voice conference, to thereby enable an intervention in the voice conference from the administrator terminal 3. The voice conference section 121 may transmit and receive a sound and/or a text to and from only some user terminals 2 that are included in a plurality of user terminals 2, and selected by the administrator terminal 3. In addition, in addition to or instead of a sound and/or a text, as an intervention, the voice conference section 121 may transmit and receive images specified by user terminals 2 (the images may be still images or moving images) and images specified by the administrator terminal 3.

The sound analyzing section 122 analyzes sounds generated in each of a plurality of voice conferences. For example, in association with each of the plurality of voice conferences, the sound analyzing section 122 calculates the utterance amount of each of a plurality of users, and also calculates the level of communication between a plurality of users (transitions of speakers).

First, on the basis of sounds acquired by the voice conference section 121, the sound analyzing section 122 decides which user uttered (spoke), at temporal intervals (e.g. every 10 milliseconds to 100 milliseconds) in a voice conference. In a case that sounds of one user are input to each user terminal 2, the sound analyzing section 122 decides which user uttered on the basis of a user terminal 2 from which sounds are acquired. In a case that sounds of a plurality of users are input to each user terminal 2, the sound analyzing section 122 executes a known speaker separation process on sounds acquired from one user terminal 2 to thereby decide which user uttered.

The sound analyzing section 122 identifies, as an utterance period, a continuous period from the start of an utterance of one user until the end of the utterance, and stores the utterance period on the storage section 11. In addition, the sound analyzing section 122 calculates an utterance amount of each user in each time unit, and stores the utterance amount on the storage section 11. For example, the sound analyzing section 122 calculates, as an utterance amount in each time unit, a value obtained by dividing the length of time during which a user uttered in a certain time window (e.g. five seconds) by the length of the time window.

From the start time of a voice conference until the current time (the end time in a case of analysis after the end of the voice conference), the sound analyzing section 122 repeats calculations of the utterance amount of each user in each time window while shifting the time window every predetermined length of time (e.g. one second). Then, in a case that another utterance period starts after an utterance period, the sound analyzing section 122 senses a transition from one speaker to another speaker. The sound analyzing section 122 totals the time of occurrence of a transition sensed in an analysis-subject discussion, a user who is a speaker before the transition and a user who is a speaker after the transition, and stores them on the storage section 11 in association with each other.

Furthermore, the sound analyzing section 122 may perform analysis by comparing sounds generated in each of a plurality of voice conferences with previously acquired sound patterns or model sound patterns. In this case, the storage section 11 stores in advance the previously acquired sound patterns or the model sound patterns. For example, the model sound patterns are time-series data of utterance amounts of model humans that is created in advance by acquiring sound patterns in voice conferences in which model humans participated, and so on.

For example, a previously acquired sound pattern or a model sound pattern is defined for each purpose of voice conferences (the use of a voice conference, the type of users of a voice conference) such as education, sales or interviews. The sound analyzing section 122 accepts, in advance, selection of the purpose of a voice conference from a user terminal 2 or the administrator terminal 3, and compares the utterance amount of each user calculated from sounds in the voice conference with a sound pattern specific to the purpose.

In addition, for example, the sound patterns may each be defined for a period in a voice conference. The sound analyzing section 122 accepts, in advance, specification of scheduled time (e.g. one hour) of a voice conference from a user terminal 2 or the administrator terminal 3, and compares the utterance amount of each user calculate from sounds in the voice conference with a sound pattern specific to a period (the first period, intermediate period, last period, etc.) in the scheduled time.

Regarding a case that a comparison with a model sound pattern is performed, for example, in a case that all users in a voice conference for an educational purpose are students (typically, in a case that the system is used for a debate among students), it can be said that it is desirable if the utterance amounts of users are as uniform as possible in any period in the scheduled time, so the model sound pattern used for the comparison is one that reflects such a tendency. In addition, even in a voice conference for an educational purpose, if there is someone whose role is to give instructions in users in the voice conference (typically, in a case that the system is used for an English-conversation class including one lecturer and one or more students at an English-conversion school or the like), it can be said that it is desirable if the utterance amounts of the students are greater than the utterance amount of the lecturer, and it is desirable if the utterance amounts of the students are as uniform as possible in a case that there are a plurality of students, so a model sound pattern used for the comparison is one that reflects such a tendency. Furthermore, in a case of a voice conference for a sales purpose (typically, in a case that the system is used for a conference for sales to a customer), it can be said that the utterance amount of a salesperson may be allowed to be great for explanation of products or services that she/he is selling from the first to intermediate periods in the scheduled time, but it is desirable if the utterance amount of the customer increases such that the salesperson can hear reactions from the customer from the intermediate to last periods, so a model sound pattern used for the comparison is one that reflects such a tendency.

As comparison results, the sound analyzing section 122 calculates the level of a difference between the utterance amount of a user and time-series data of an utterance amount represented by a sound pattern (e.g. the cumulative value of differences between an utterance amount in the sound pattern and the utterance amount of the user), and causes the storage section 11 to store the comparison results.

On the basis of results of sound analysis by the sound analyzing section 122, the suggesting section 123 suggests, to the administrator terminal 3, an intervention in any of a plurality of voice conferences. Interventions to voice conferences mean participation in the voice conferences by the administrator using a text and/or a sound on the administrator terminal 3. For example, in a case that results of analysis of one voice conference by the sound analyzing section 122 satisfy a predetermined condition, the suggesting section 123 identifies the voice conference as an intervention subject, and causes the display control section 124 to notify the identified intervention-subject voice conference to the administrator terminal 3. For example, in a case that there is a user whose utterance amount is equal to or smaller than a predetermined value in a voice conference, in a case that the total utterance amount of a plurality of users participating in a voice conference is equal to or smaller than a predetermined value, or in other cases, the suggesting section 123 suggests the voice conference as an intervention subject.

On the basis of analysis by the sound analyzing section 122, the display control section 124 causes a user terminal 2 and the administrator terminal 3 to display the situation of a voice conference and analysis results. Specific display content of the display control section 124 is mentioned later by using FIG. 3 to FIG. 6.

Each user terminal 2 has a display section 21, the sound input/output section 22, an image capturing section 23 and an operation section 24. The administrator terminal 3 has a display section 31, a sound input/output section 32, an image capturing section 33 and an operation section 34. The display sections 21 and 31 include liquid crystal displays or the like that can display information. The sound input/output sections 22 and 32 include microphones or the like for inputting sounds, and speakers or the like for outputting sounds. In a case that sounds of a plurality of users are input to one user terminal 2, the sound input/output section 22 may include a plurality of microphones, a microphone array or the like in accordance with speaker separation processes to be performed at the sound analyzing section 122. The image capturing sections 23 and 33 include cameras or the like that output captured images obtained by capturing images of users or the administrator. The operation sections 24 and 34 include buttons, switches, touch panels or the like that can accept operation by humans.

The configuration of the voice conference apparatus 1, user terminals 2 and administrator terminal 3 according to the present embodiment is not limited to specific configuration depicted in FIG. 2. The numbers of apparatuses for the voice conference apparatus 1, user terminal 2 and administrator terminal 3 are not limited to one, but each of them may be configured by connecting two or more physically separate apparatuses by a cable or wirelessly.

[Explanation of Voice Conference Method]
(Display Screen of User Terminal 2)

First, a process in which the voice conference apparatus 1 causes a user terminal 2 to display information about a voice conference is explained below. In the voice conference apparatus 1, the display control section 124 causes the user terminal 2 to display a voice conference list screen including information about a plurality of voice conferences in which users can participate.

The following explanation is about a case that a plurality of users participating in voice conferences held for the purpose of a predetermined voice conference or the like are grouped into a plurality of groups each allocated with one of a plurality of rooms (virtual rooms), and voice conferences are held. That is, the following explanation is about a case that rooms (virtual rooms) are provided in a voice conference (an upper-layer voice conference) held for the purpose of a predetermined voice conference or the like, and a plurality of lower-layer voice conferences are held in the rooms (virtual rooms).

Figure 3:
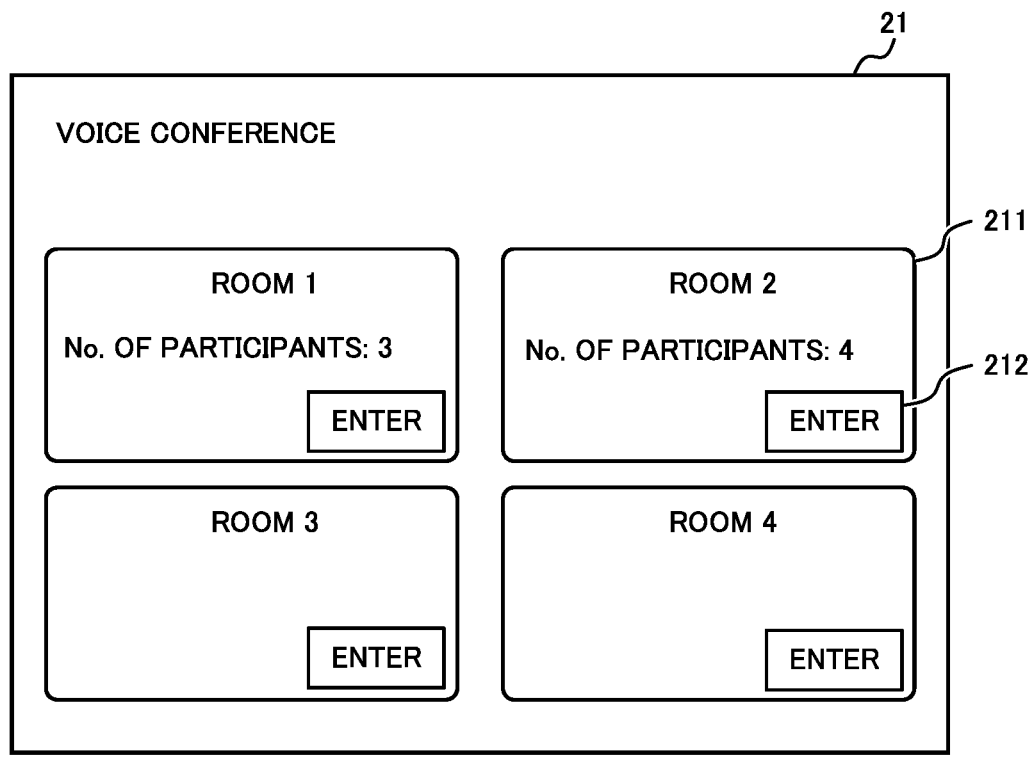
FIG. 3 is a schematic diagram of a user terminal displaying an exemplary voice conference list screen.

FIG. 3 is a schematic diagram of a user terminal 2 displaying an exemplary voice conference list screen. Under the control of the voice conference apparatus 1, the user terminal 2 is displaying a voice conference list screen on the display section 21. The voice conference list screen represents voice conference information 211 and an entry buttons 212 in association with each of a plurality of voice conferences (rooms). The voice conference information 211 represents the number of users participating in a voice conference. In addition, the voice conference information 211 may represent the names of users participating in a voice conference, the purpose of the voice conference or the like.

In a case that operation is performed to select any of the entry buttons 212 on the operation section 24 of the user terminal 2, the voice conference section 121 allows a user of the user terminal 2 to participate in the voice conference (room) corresponding to the selected entry button 212, and starts the voice conference. In addition, the voice conference section 121 may allow the user of the user terminal 2 to automatically participate in a voice conference (room) allocated in advance.

Figure 4:
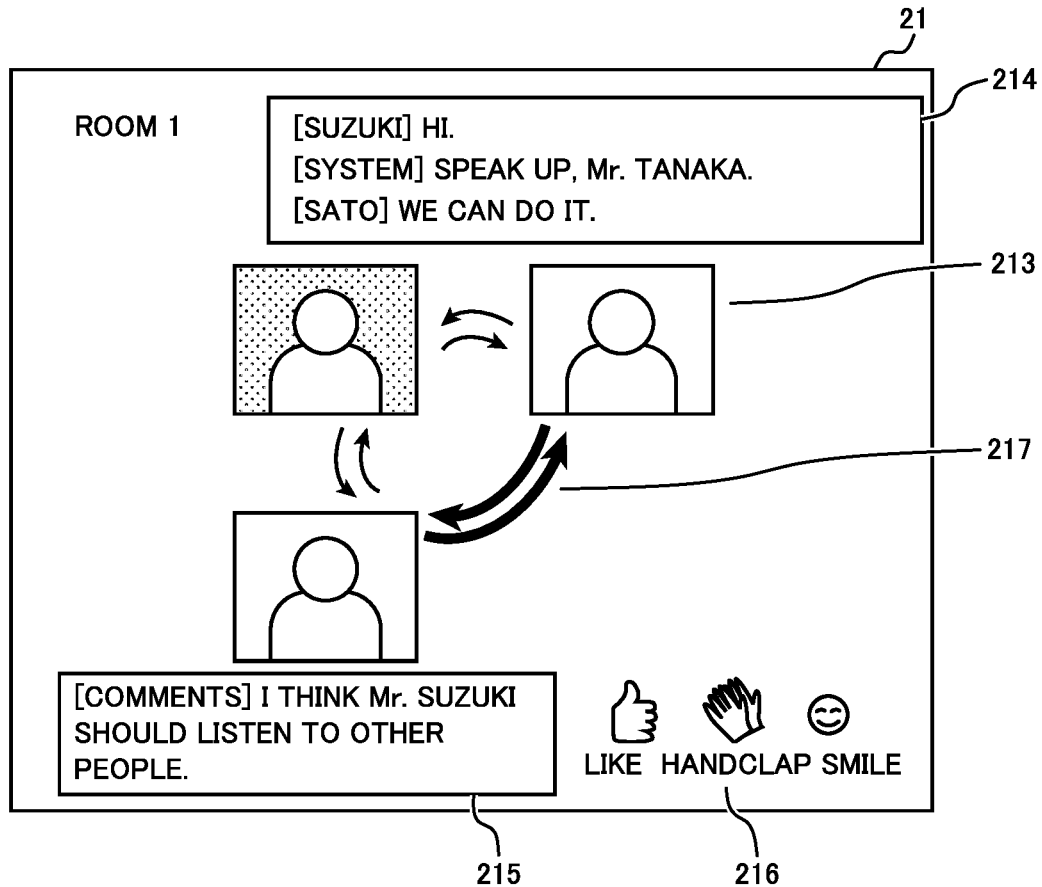
FIG. 4 is a schematic diagram of a user terminal displaying an exemplary voice conference screen.

The display control section 124 causes a user terminal 2 to display a voice conference screen including information about a voice conference in which the user is participating. FIG. 4 is a schematic diagram of a user terminal 2 displaying an exemplary voice conference screen. Under the control of the voice conference apparatus 1, the user terminal 2 is displaying a voice conference screen on the display section 21.

About the voice conference (room) in which the user of the user terminal 2 is participating, the voice conference screen displays user images 213, text information 214, an input field 215, an action field 216 and an analysis result 217. The user images 213 are captured images of users obtained by capturing images by using the image capturing sections 23 of a plurality of user terminals 2. In a case that a captured image cannot be acquired from a user terminal 2 or in a case that a user does not want her/his captured image to appear on screen, a predetermined image or text (the name of the user, etc.) may be displayed at the position of the user image 213.

The text information 214 represents a message input on the operation section 24 of each of the plurality of user terminals 2. In addition, the text information 214 may represent a message generated by the voice conference apparatus 1 (e.g. an automatic intervention message mentioned later).

The input field 215 is an area for a user to input a comment (e.g. a thought or an annotation) during the voice conference. The comment input to the input field 215 is stored on the storage section 11 of the voice conference apparatus 1 in association with the time of input. The action field 216 is an area for a user to input an action during the voice conference. For example, the action field 216 includes a plurality of buttons (icons) corresponding to a plurality of actions such as like, handclap, smile and the like. An action input in the action field 216 is stored on the storage section 11 of the voice conference apparatus 1 in association with the time of input.

The analysis result 217 represents results of sound analysis in a voice conference by the voice conference apparatus 1 while the voice conference is underway. While a voice conference is underway, on the basis of results of analysis by the sound analyzing section 122, the display control section 124 displays, as the analysis result 217 and about each pair of users, arrow symbols representing the number of times of transition (i.e. the level of communication among a plurality of users) that has occurred from the start time until the current time in the voice conference. The thicknesses of the displayed arrow symbols of the analysis result 217 increase as the number of times of transition increases, and decrease as the number of times of transition decreases. Thereby, while the voice conference is underway, the voice conference system S can visually notify a user of the level of communication among users in the voice conference.

In addition, while a voice conference is underway, the display control section 124 changes the display mode of a user image 213 in accordance with the utterance amount of the user on the basis of results of analysis by the sound analyzing section 122. The display control section 124 totals the utterance amount of each user from the start time of the voice conference until the current time. Then, in a case that the utterance amount of one user (or the ratio of utterance compared to other users) is equal to or smaller than a predetermined value, the display control section 124 makes different the color, size, shape, frame line or the like of the user image 213 of the user from those of the user images 213 of other users. Thereby, the voice conference system S can encourage users who utter less to utter more.

In addition, the display control section 124 may switch whether to or not to display the analysis result 217 on each of the plurality of user terminals 2. For example, the display control section 124 switches whether to or not to display the analysis result 217 in accordance with the purpose of a voice conference. In addition, the display control section 124 may acquire information representing the degree of proficiency or personality of a user stored on the storage section 11 in advance, and display the analysis result 217 only on the user terminal 2 of a user whose acquired degree of proficiency or personality satisfies a predetermined condition (e.g. that the user is a highly proficient user or has a personality favoring discussions). In addition, the display control section 124 may display the analysis result 217 only on the user terminal 2 of a user specified by the administrator. In addition, the display control section 124 may acquire the line-of-sight direction of a user by a known line-of-sight sensing method, and display the analysis result 217 only on the user terminal 2 of a user whose acquired line-of-sight direction satisfies a predetermined condition (e.g. the user has not gazed at the analysis result 217 for a predetermined length of time or longer).

Next, a process in which the voice conference apparatus 1 causes the administrator terminal 3 to display information about a voice conference is explained below. In the voice conference apparatus 1, the display control section 124 causes the administrator terminal 3 to display a voice conference list screen including information about a plurality of voice conferences administered by the administrator.

(Display Screen of Administrator Terminal 3)

The following explanation also is about a case that a plurality of users participating in voice conferences held for the purpose of a predetermined voice conference or the like are grouped into a plurality of groups each allocated with one of a plurality of rooms (virtual rooms), and voice conferences are held. That is, the following explanation is about a case that rooms (virtual rooms) are provided in a voice conference (an upper-layer voice conference) held for the purpose of a predetermined voice conference or the like, and a plurality of lower-layer voice conferences are held in the rooms (virtual rooms).

Note that in a case that the administrator is administering a plurality of upper-layer voice conferences, it may be made possible to cause the administrator terminal 3 to display a voice conference list screen including information about the plurality of upper-layer voice conferences even in a case that a plurality of lower-layer voice conferences are being held. In this case, as the information about the upper-layer voice conferences, information about all the voice conferences being held in the upper-layer voice conferences may be displayed without making distinctions between the lower-layer voice conferences. Alternatively, it may be made possible to display information about particular lower-layer voice conferences in upper-layer voice conferences selectively such that information about a particular lower-layer voice conference in one upper-layer voice conference, and information about a lower-layer voice conference in another upper-layer voice conference can be displayed.

Figure 5A:
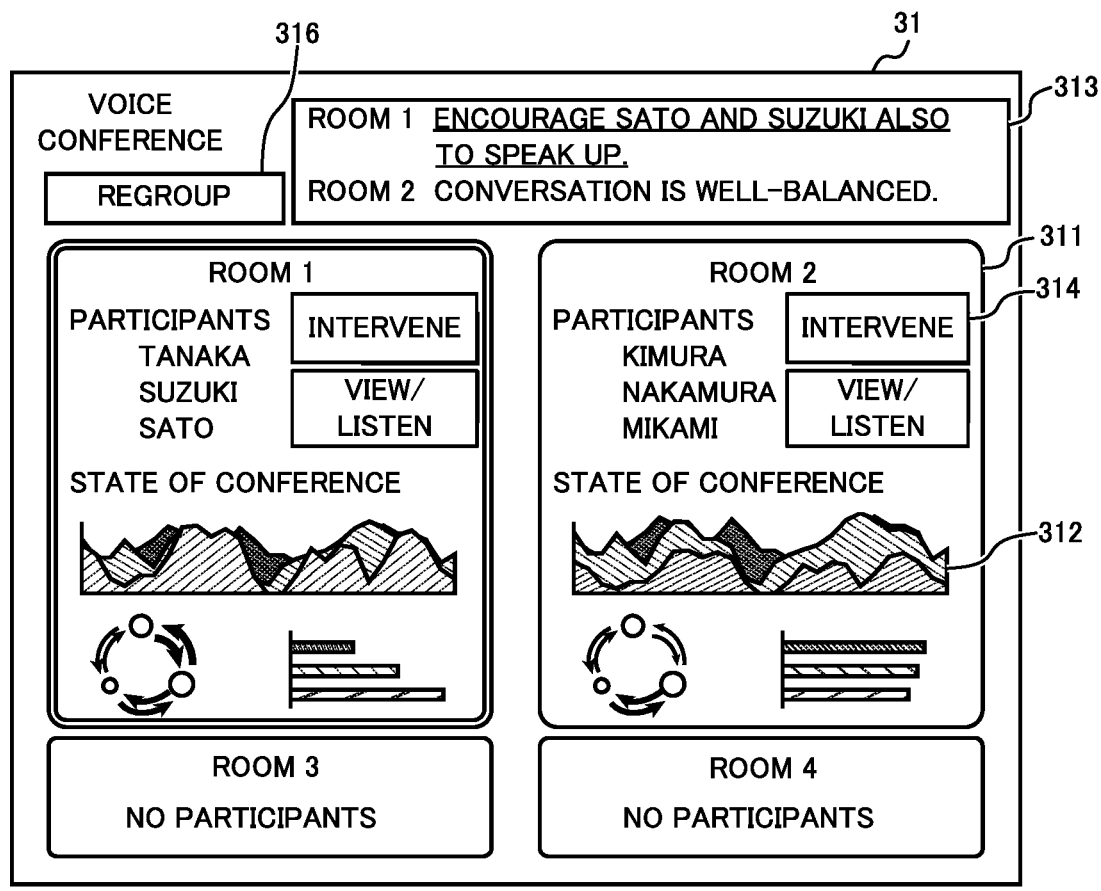
FIG. 5A is a schematic diagram of an administrator terminal displaying an exemplary voice conference list screen.
Figure 5B:
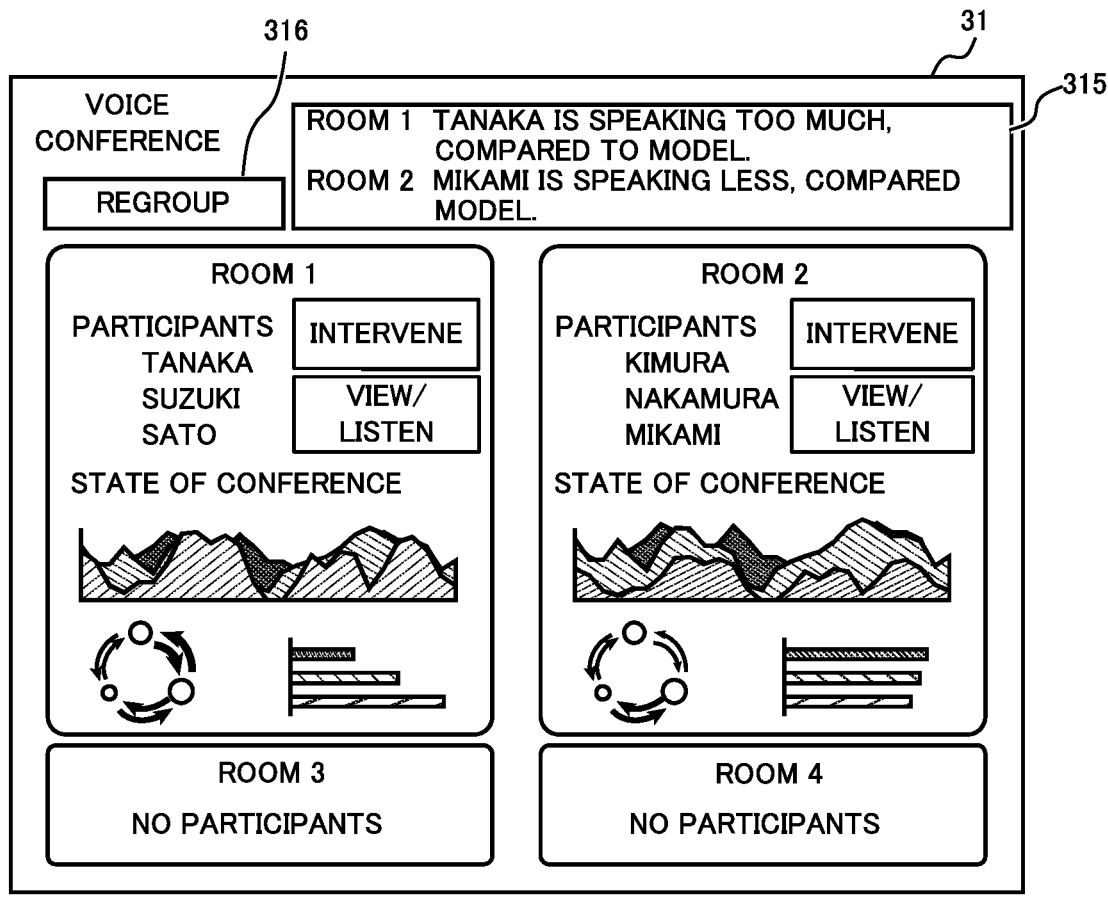
FIG. 5B is a schematic diagram of an administrator terminal displaying an exemplary voice conference list screen.

FIG. 5A and FIG. 5B are schematic diagrams of the administrator terminal 3 displaying exemplary voice conference list screens. Under the control of the voice conference apparatus 1, the administrator terminal 3 is displaying a voice conference list screen on the display section 31. The voice conference list screen displays voice conference information 311 and an analysis result 312 in association with each of a plurality of lower-layer voice conferences (rooms) included in an upper-layer voice conference administered by the administrator. The voice conference information 311 represents the names of users participating in voice conferences. The voice conference information 311 may represent the numbers of users participating in a voice conference, the purposes of the voice conferences and the like. The analysis result 312 represents results of analysis of the voice conferences by the sound analyzing section 122. In addition, the voice conference list screen includes suggestion information 313, intervention buttons 314, comparison information 315 and a regroup button 316 that are mentioned later.

The display control section 124 causes the administrator terminal 3 to display the analysis result 312 of analysis, by the sound analyzing section 122, of sounds generated in each of a plurality of voice conferences (rooms), in association with the voice conference. It is desirable if, while the plurality of voice conferences are underway, the display control section 124 causes the administrator terminal 3 to display analysis results in association with each of the plurality of voice conferences. Thereby, the voice conference system S can notify the administrator of the situations of the plurality of voice conferences being held currently, and make it easier for the administrator to determine whether or not it is necessary to intervene in the plurality of voice conferences.

For example, on the basis of results of analysis by the sound analyzing section 122, the display control section 124 displays, as the analysis result 312 and about each pair of users participating in one voice conference, arrow symbols representing the number of times of transition (i.e. the level of communication among a plurality of users) that has occurred from the start time until the current time in the voice conference. The thicknesses of the displayed arrow symbols of the analysis result 312 increase as the number of times of transition increases, and decrease as the number of times of transition decreases. Thereby, while the voice conferences are underway, the voice conference system S can visually notify the administrator of the levels of communication among users in the voice conferences.

For example, on the basis of results of analysis by the sound analyzing section 122, the display control section 124 displays, as the analysis result 312, a line graph representing temporal changes of the utterance amount of each of a plurality of users participating in one voice conference (room). Using a line graph having a longitudinal axis representing the utterance amount, and a horizontal axis representing time, the display control section 124 displays the utterance amount of each user at each time point represented by analysis results. At this time, the display control section 124 stacks up the utterance amounts of users at each time point one on another, that is, displays the total value of the utterance amounts of the users in order along the longitudinal axis. Thereby, while the voice conferences are underway, the voice conference system S can visually notify the administrator of the overall utterance amounts of voice conferences, in addition to the utterance amount of each user participating in a voice conference.

For example, on the basis of results of analysis by the sound analyzing section 122, the display control section 124 displays, as the analysis result 312, a bar graph representing the total value of the utterance amount of each of a plurality of users participating in one voice conference. Thereby, while the voice conferences are underway, the voice conference system S can visually notify the administrator of the total value of the utterance amount of each user.

In a case that operation is performed to select an arrow symbol, a line graph or a bar graph included in the analysis result 312 on the operation section 34 of the administrator terminal 3, the display control section 124 may expand the selected arrow symbol, line graph or bar graph to display details of the selected arrow symbol, line graph or bar graph. As the analysis result 312, the display control section 124 may not necessarily display arrow symbols, line graphs and bar graphs, but display other analysis results obtained by analyzing sounds, in association with each of a plurality of voice conferences (rooms).

The display control section 124 causes the administrator terminal 3 to display information representing a voice conference (room) for which the suggesting section 123 is suggesting an intervention. As depicted in FIG. 5A, the display control section 124 causes the voice conference list screen being displayed by the administrator terminal 3 to display the suggestion information 313 representing a voice conference for which the suggesting section 123 is suggesting an intervention. For example, the suggestion information 313 caused to be displayed by the display control section 124 include a text that can identify a voice conference (room) for which the suggesting section 123 is suggesting an intervention, as well as a text explaining a reason why the intervention is necessary.

In addition, the display control section 124 makes different the display mode of the voice conference information 311 corresponding to a voice conference for which the suggesting section 123 is suggesting an intervention in a plurality of voice conferences included in the voice conference list screen being displayed by the administrator terminal 3 from the display modes of the voice conference information 311 corresponding to the other voice conferences. Whereas the display control section 124 changes the display mode of the voice conference information 311 by using a different frame line in the example in FIG. 5A, the color, size, shape or the like of the voice conference information 311 may be changed.

As depicted in FIG. 5B, the display control section 124 may cause the comparison information 315 representing comparison results calculated by the sound analyzing section 122 to be displayed. For example, the suggestion information 313 caused to be displayed by the display control section 124 includes a text that can identify a voice conference for which a comparison with a sound pattern was performed, as well as a text explaining the comparison results. In addition, the display control section 124 may cause not only the administrator terminal 3, but also a user terminal 2 to display results of a comparison of sounds with a sound pattern. Thereby, the voice conference system S can present, to the administrator, results of sound analysis relative to a sound pattern acquired in advance, and make it easier for the administrator or a user to interpret the analysis results.

On the voice conference list screen being displayed by the administrator terminal 3, the display control section 124 may display an action and a comment input by a user while a voice conference is underway, in addition to results of analysis by the sound analyzing section 122. As mentioned above, the action is any of a plurality of actions such as like, handclap or smile input by the user on the user terminal 2 during the voice conference, and is stored on the storage section 11 in association with the time of input. The comment is a thought, an annotation or the like input by the user on the user terminal 2 during the voice conference, and is stored on the storage section 11 in association with the time of input.

Figure 6:
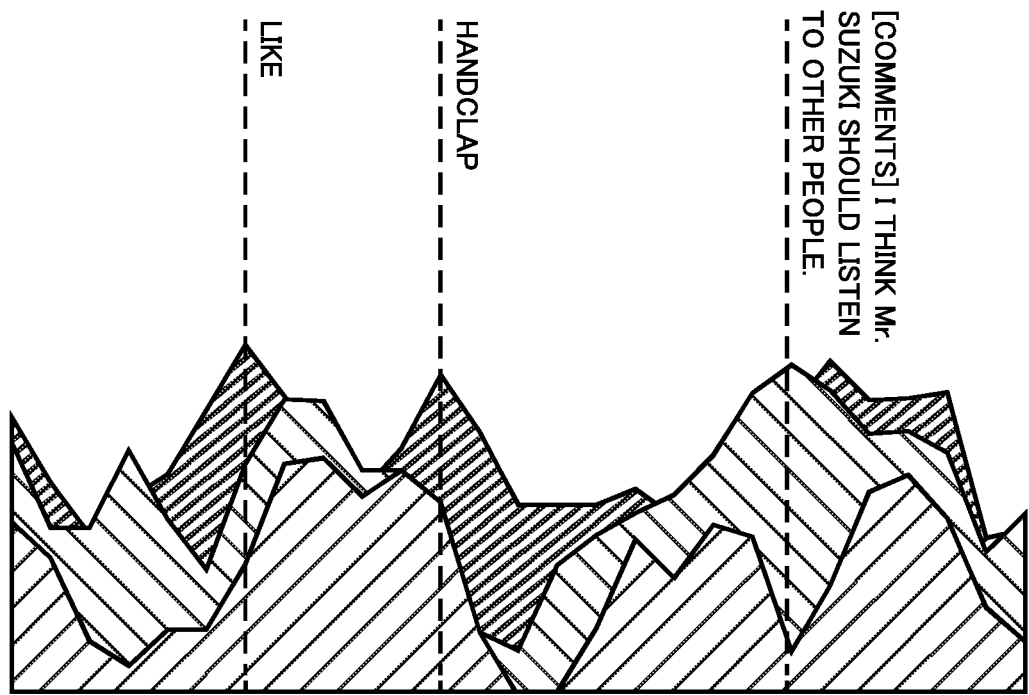
FIG. 6 is a schematic diagram for explaining a method of displaying actions on analysis results.

FIG. 6 is a schematic diagram for explaining a method of displaying actions and comments on analysis results. For example, the display control section 124 causes the analysis result 312 included in the voice conference list screen to display a text representing the content of an action and a comment at positions corresponding to the times of input of the action and the comment above the line graph representing temporal changes of utterance amounts. In addition, the display control section 124 may cause not only the administrator terminal 3, but also a user terminal 2 to display an action and a comment. Thereby, the voice conference system S can present analysis results along with an action and a comment of a user input during a voice conference, and make it easier for the administrator or a user to interpret analysis results.

In addition, while a voice conference is underway, the display control section 124 may cause one user terminal 2 to display information representing an action input on another user terminal 2. Thereby, a user can notify another user of her/his opinion such as an agreement without interrupting an ongoing conversation.

(User Grouping Process)

In a case that operation is performed to select the regroup button 316 included in the voice conference list screen depicted in FIG. 5A and FIG. 5B on the operation section 34 of the administrator terminal 3, in the voice conference apparatus 1, the sound analyzing section 122 may group a plurality of users into a plurality of groups for executing a plurality of voice conferences on the basis of analysis results of a plurality of voice conferences. That is, on the basis of the analysis results, the sound analyzing section 122 suggests a plurality of groups that are preferable for executing voice conferences in the future.

Figure 7:
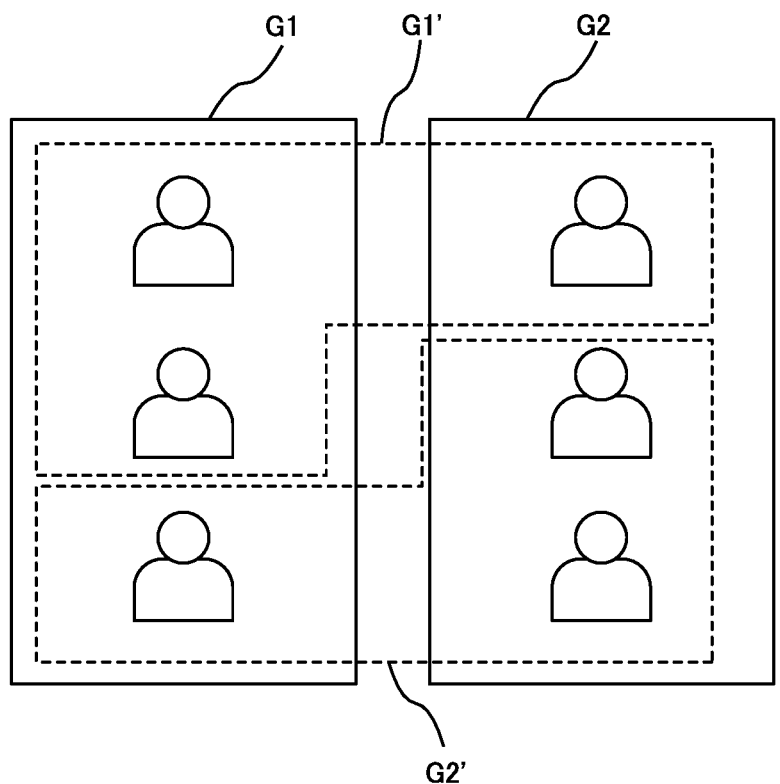
FIG. 7 is a schematic diagram for explaining a method of grouping a plurality of users into a plurality of groups on the basis of analysis results.

FIG. 7 is a schematic diagram for explaining a method of grouping a plurality of users into a plurality of groups on the basis of analysis results. It is supposed that the sound analyzing section 122 has stored, on the storage section 11, analysis results of analysis of sounds of each of two voice conferences corresponding to groups G1 and G2 into which the plurality of users are grouped. On the basis of the analysis results stored on the storage section 11, the sound analyzing section 122 groups the plurality of users into new groups G1' and G2'.

Note that whereas regrouping in the explanation here means regrouping into rooms (virtual rooms) (into lower-layer voice conferences) to group users in the groups G1 and G2 into the new groups G1' and G2', regrouping may include content meaning division of a voice conference in a room (virtual room) into smaller lower-layer voice conferences.

For example, on the basis of the analysis results, the sound analyzing section 122 groups the plurality of users into a plurality of groups such that the utterance amounts or utterance tendencies of a plurality of users belonging to one group are similar to each other. In this case, the sound analyzing section 122 clusters the utterance amounts of the plurality of users by using a known method, and sets each cluster as a group.

In addition, for example, the sound analyzing section 122 may group, into the same group, users having the utterance tendency of interrupting utterances of others in a voice conference in the middle often, the utterance tendency of uttering in any of the first period, the intermediate period and the last period in a voice conference often or another utterance tendency. On the other hand, the sound analyzing section 122 may group a plurality of users into a plurality of groups such that the utterance amounts or utterance tendencies of a plurality of users belonging to one group are not similar to each other.

In addition, the sound analyzing section 122 may group a plurality of users into a plurality of groups on the basis of an attribute of each of the plurality of users, in addition to analysis results. For example, the attributes of users are grades of the users at school or results of personality diagnosis implemented in advance on the users. In this case, the sound analyzing section 122 groups the plurality of users into a plurality of groups such that the attributes of a plurality of users belonging to each group are similar to or not similar to each other.

The voice conference section 121 automatically starts voice conferences in which a plurality of users included in each of a plurality of groups generated by the sound analyzing section 122 participate. In addition, by displaying information representing a voice conference corresponding to a group including users on the voice conference list screen displayed by the user terminal 2 in FIG. 3, the display control section 124 may notify a user of a voice conference in which the user should participate.

In this manner, the voice conference system S can make it possible to efficiently perform learning or evaluation of users by suggesting groups for holding voice conferences each with similar users or dissimilar users.

(Automatic Intervention Based on Sound Analysis Results)

By using a sound and/or a text, the voice conference section 121 may automatically intervene in a voice conference (room) for which the suggesting section 123 is suggesting an intervention. In this case, the voice conference section 121 decides intervention content on the basis of results of analysis by the sound analyzing section 122. For example, in a case that there is a user whose utterance amount is equal to or smaller than a predetermined value in a voice conference, the voice conference section 121 decides intervention content to encourage the user to utter more. In addition, for example, in a case that the total utterance amount of a plurality of users participating in a voice conference is equal to or smaller than a predetermined value, the voice conference section 121 decides intervention content to encourage all of them to utter more.

Then, the voice conference section 121 generates an automatic sound (mechanical sound) representing intervention content, and causes the plurality of user terminals 2 participating in the voice conference to output the automatic sound, or generates a text representing intervention content, and causes the plurality of user terminals 2 participating in the voice conference to display the text. Thereby, on the basis of results of sound analysis, the voice conference system S can automatically intervene in a voice conference that requires an intervention, and facilitate the proceedings of the voice conference while reducing a burden on the administrator. The voice conference section 121 may automatically intervene only in some user terminals 2 that are included in the plurality of user terminals 2, and selected on the basis of a predetermined condition. In this case, for example, as an intervention subject, the voice conference section 121 selects the user terminal 2 of a user whose utterance amount is equal to or smaller than a predetermined value.

Note that, as mentioned above, in addition to or instead of a sound and/or a text, as an intervention, the voice conference section 121 may transmit and receive an image specified by a user terminal 2 (the image may be a still image or a moving image) and an image specified by the administrator terminal 3.

[Procedure of Voice Conference]

Figure 8:
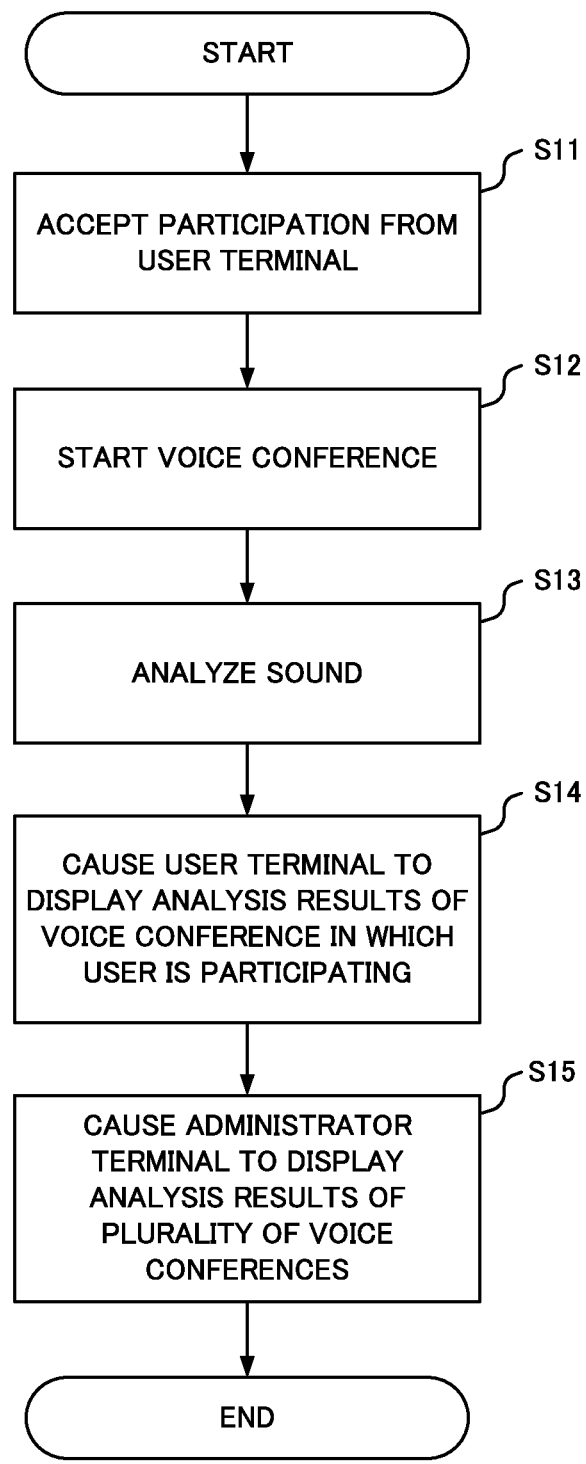
FIG. 8 is a figure depicting a flowchart of a voice conference method executed by a voice conference apparatus.

FIG. 8 is a figure depicting a flowchart of a voice conference method executed by the voice conference apparatus 1. In the voice conference apparatus 1, the display control section 124 causes a user terminal 2 to display a voice conference list screen including information about a plurality of voice conferences in which a user can participate.

In accordance with operation on the operation section 24 of the user terminal 2, the voice conference section 121 accepts participation of the user in any of the voice conferences (S11). By starting exchange of sounds between a plurality of user terminals 2 of a plurality of users participating in the voice conference, the voice conference section 121 starts the voice conference (S12).

The sound analyzing section 122 analyzes sounds generated in each of a plurality of voice conferences (S13). For example, in association with each of the plurality of voice conferences, the sound analyzing section 122 calculates the utterance amount of each of a plurality of users, and also calculates the level of communication between a plurality of users (transitions of speakers).

The display control section 124 causes the user terminal 2 to display results of analysis by the sound analyzing section 122 (S14). For example, while the voice conference is underway, on the basis of the results of analysis by the sound analyzing section 122, the display control section 124 causes the user terminal 2 to display arrow symbols representing the levels of communication between a plurality of users. In addition, for example, while the voice conference is underway, the display control section 124 changes the display mode of a user image in accordance with the utterance amount of the user on the basis of the results of analysis by the sound analyzing section 122.

The display control section 124 causes the administrator terminal 3 to display the analysis result 312 of analysis, by the sound analyzing section 122, of sounds generated in each of a plurality of voice conferences, in association with the voice conference (S15). For example, while the voice conference is underway, on the basis of the results of analysis by the sound analyzing section 122, the display control section 124 causes the administrator terminal 3 to display arrow symbols representing the levels of communication between a plurality of users.

In addition, for example, while the voice conference is underway, on the basis of the results of analysis by the sound analyzing section 122, the display control section 124 causes the administrator terminal 3 to display a line graph representing temporal changes of the utterance amount of each of the plurality of users participating in the one voice conference. In addition, for example, while the voice conference is underway, on the basis of the results of analysis by the sound analyzing section 122, the display control section 124 causes the administrator terminal 3 to display a bar graph representing the total value of the utterance amount of each of the plurality of users participating in the one voice conference.

Advantages of Present Embodiment

According to the voice conference system S according to the present embodiment, the voice conference apparatus 1 analyzes sounds generated in each of a plurality of voice conferences, and causes the administrator terminal 3 to display results of the sound analysis in association with the corresponding one of the plurality of voice conferences. Thereby, the voice conference system S makes it possible to give the administrator an overall perspective of the situations of the plurality of voice conferences, and allow the administrator to easily know the situations of the plurality of voice conferences.

Although the present invention has been explained above by using an embodiment, the technical scope of the present invention is not limited to the scope of description of the embodiment described above, but can be modified and changed variously within the scope of its gist. For example, the whole or part of an apparatus can be configured in a functionally or physically distributed or integrated manner in any units. In addition, a new embodiment generated by any combination of a plurality of embodiments is also included in embodiments of the present invention. Advantages of the new embodiment generated by the combination include advantages of the original embodiments.

The processor of the voice conference apparatus 1 is the main one that performs each step (step) included in the voice conference method depicted in FIG. 8. That is, the processor of the voice conference apparatus 1 reads out, from the storage section 11, a program for executing the voice conference method depicted in FIG. 8, and executes the program to control each section of the voice conference apparatus 1, to thereby execute the voice conference method depicted in FIG. 8. Some of the steps included in the voice conference method depicted in FIG. 8 may be omitted, the order of the steps may be changed, and a plurality of steps may be performed in parallel.

What is claimed is:

1. A voice conference apparatus that provides a plurality of voice conferences via a network, the voice conference apparatus comprising:
   a voice conference section that transmits and receives a sound generated in each of the plurality of voice conferences to and from a plurality of user terminals used by a plurality of users participating in the voice conference;
   a sound analyzing section that analyzes the sound generated in each of the plurality of voice conferences; and
   a display control section that causes an administrator terminal used by an administrator administering the plurality of voice conferences to display a result of the analysis, by the sound analyzing section, of the sound generated in each of the plurality of voice conferences, in association with the voice conference, wherein
   the sound analyzing section performs the analysis by comparing the sound generated in each of the plurality of voice conferences with a previously acquired sound pattern or a model sound pattern, and
   outputs, as the result of the analysis, information corresponding to a difference between an utterance amount of each of the plurality of users in the sound generated in each of the plurality of voice conferences and an utterance amount represented by the previously acquired sound pattern or the model sound pattern.

2. The voice conference apparatus according to claim 1, wherein, while the plurality of voice conferences are underway, the display control section causes the administrator terminal to display the result of the analysis in association with each of the plurality of voice conferences.

3. The voice conference apparatus according to claim 2, wherein, while the plurality of voice conferences are underway, the display control section causes the administrator terminal to display the result of the analysis corresponding to directions of transitions of utterances between the plurality of users, and the number of times of the transitions of the directions, in association with each of the plurality of voice conferences.

4. The voice conference apparatus according to claim 1, wherein the voice conference section accepts an intervention using at least one of a sound, a text and an image in any of the plurality of voice conferences by the administrator terminal.

5. The voice conference apparatus according to claim 4, further comprising a suggesting section that suggests, to the administrator terminal, an intervention in any of the plurality of voice conferences on a basis of the result of the analysis.

6. The voice conference apparatus according to claim 5, wherein the display control section makes different a display mode of the voice conference for which the suggesting section is suggesting the intervention in the plurality of voice conferences from display modes of the other voice conferences.

7. The voice conference apparatus according to claim 1, wherein on a basis of the result of the analysis, the voice conference section automatically intervenes in any of the plurality of voice conferences by using at least one of a sound, a text and an image.

8. The voice conference apparatus according to claim 1, wherein, while the voice conference is underway, the display control section causes each of the plurality of user terminals used by the plurality of users participating in the voice conference to display the result of the analysis.

9. The voice conference apparatus according to claim 8, wherein, while the voice conference is underway, the display control section causes a symbol representing a level of communication of utterances between the plurality of users in the voice conference to be displayed between a plurality of captured images obtained by capturing images of the plurality of users.

10. The voice conference apparatus according to claim 1, wherein
    while the voice conference is underway, the voice conference section accepts input of a predetermined action from each of the plurality of user terminals used by the plurality of users participating in the voice conference, and
    in addition to the result of the analysis of the sound, the display control section causes the administrator terminal to display information representing the action input on each of the plurality of voice conferences.

11. The voice conference apparatus according to claim 1, wherein the previously acquired sound pattern or the model sound pattern is a sound pattern specific to a purpose of the voice conference.

12. The voice conference apparatus according to claim 1, wherein the previously acquired sound pattern or the model sound pattern is a sound pattern specific to a period in the voice conference.

13. The voice conference apparatus according to claim 1, wherein
    the sound analyzing section groups the plurality of users into a plurality of groups on a basis of the result of the analysis, and
    the voice conference section starts a voice conference in which a plurality of users included in a corresponding one of the plurality of groups participate.

14. The voice conference apparatus according to claim 13, wherein the sound analyzing section groups the plurality of users into a plurality of groups on a basis of an attribute of each of the plurality of users, in addition to the result of the analysis.

15. The voice conference apparatus according to claim 13, wherein on a basis of the result of the analysis, the sound analyzing section groups the plurality of users into a plurality of groups such that utterance amounts or utterance tendencies of the plurality of users belonging to each group are similar to each other.

16. A voice conference system comprising:
a voice conference apparatus that provides a plurality of voice conferences via a network; and
an administrator terminal used by an administrator administering the plurality of voice conferences, wherein
the voice conference apparatus has:
a voice conference section that transmits and receives a sound generated in each of the plurality of voice conferences to and from a plurality of user terminals used by a plurality of users participating in the voice conference;
a sound analyzing section that analyzes the sound generated in each of the plurality of voice conferences; and
a display control section that causes the administrator terminal to display a result of the analysis, by the sound analyzing section, of the sound generated in each of the plurality of voice conferences, in association with the voice conference, and
the administrator terminal has a display section that displays the result of the analysis, wherein
the sound analyzing section performs the analysis by comparing the sound generated in each of the plurality of voice conferences with a previously acquired sound pattern or a model sound pattern, and
outputs, as the result of the analysis, information corresponding to a difference between an utterance amount of each of the plurality of users in the sound generated in each of the plurality of voice conferences and an utterance amount represented by the previously acquired sound pattern or the model sound pattern.

17. A voice conference method executed by a computer, the voice conference method comprising:
transmitting and receiving a sound generated in each of a plurality of voice conferences via a network to and from a plurality of user terminals used by a plurality of users participating in the voice conference;
analyzing the sound generated in each of the plurality of voice conferences; and
causing an administrator terminal used by an administrator administering the plurality of voice conferences to display a result of the analysis, at the step of analyzing, of the sound generated in each of the plurality of voice conferences, in association with the voice conference, wherein
the step of analyzing comprises performing the analysis by comparing the sound generated in each of the plurality of voice conferences with a previously acquired sound pattern or a model sound pattern, and
outputting, as the result of the analysis, information corresponding to a difference between an utterance amount of each of the plurality of users in the sound generated in each of the plurality of voice conferences and an utterance amount represented by the previously acquired sound pattern or the model sound pattern.

* * * * *